(12) United States Patent
Tomonaga

(10) Patent No.: US 7,204,354 B2
(45) Date of Patent: Apr. 17, 2007

(54) ROTARY DAMPER

(75) Inventor: Takao Tomonaga, Shizuoka (JP)

(73) Assignee: Showa Corporation, Saitama (JP)

( * ) Notice: Subject to any disclaimer, the term of this patent is extended or adjusted under 35 U.S.C. 154(b) by 85 days.

(21) Appl. No.: 11/011,922

(22) Filed: Dec. 14, 2004

(65) Prior Publication Data

US 2005/0274582 A1    Dec. 15, 2005

(30) Foreign Application Priority Data

Jun. 9, 2004  (JP)  ............................. 2004-171844
Nov. 17, 2004 (JP)  ............................. 2004-333764

(51) Int. Cl.
*F16F 9/14* (2006.01)
(52) U.S. Cl. ...................... 188/308; 188/310
(58) Field of Classification Search ................ 188/306, 188/307, 308, 310, 309
See application file for complete search history.

(56) References Cited

U.S. PATENT DOCUMENTS 2,043,489 A * 6/1936 Peo ............................ 188/309
2,286,516 A * 6/1942 Swanson ..................... 188/310
3,152,666 A * 10/1964 Dickinson ................... 188/308
6,318,522 B1 * 11/2001 Johnston et al. ......... 188/267.2

FOREIGN PATENT DOCUMENTS

JP         04000032 A  *  1/1992
JP         2593461       12/1996

OTHER PUBLICATIONS

Japanese Patent Application Laid-open No. 2003-175877, Jun. 24, 2003.
Japanese Patent Application Laid-open No. 2004-231036, Aug. 19, 2004.

* cited by examiner

*Primary Examiner*—Thomas Williams
(74) *Attorney, Agent, or Firm*—Orum & Roth LLC

(57) ABSTRACT

In a rotary damper, an outer lid is attached to an outer side surface of a casing. A first oil passage and a second oil passage are in respective communication. A first oil chamber and a second oil chamber are provided in parallel between the outer side surface of the casing and the inner side surface of the outer lid. A first check valve is provided in the first oil passage, a second check valve is provided in the second oil passage, and an orifice plate is movably provided so as to face both the first oil passage and the second oil passage.

15 Claims, 11 Drawing Sheets

ROTARY DAMPER

BACKGROUND OF THE INVENTION

1. Field of the Invention

The present invention relates to a steering damper provided in a steering wheel of a motor cycle or the like, or a rotary damper preferably used in a suspension damper or the like provided in a rear wheel suspension apparatus of the motor cycle or the like.

2. Description of the Related Art

As for the rotary damper, there are structures described in Japanese Patent No. 2593461, Japanese Patent Application Laid-open No. 2003-175877, and Japanese Patent Application Laid-open No. 2004-231036.

The rotary damper described in Japanese Patent No. 2593461 is structured, as shown in FIG. 12, such that a rotor 2 is provided within a casing 1, and first and second oil chambers 3A and 3B are sectioned in both sides of a vane of the rotor 2. The structure is made such that two oil chambers 3A and 3B are connected by a single oil passage 4, and a damping force generating apparatus 5 is interposed in the oil passage 4. The single oil passage 4 is used for every rotation of the rotor 2, and a damping force is generated by the single damping force generating apparatus 5.

The rotary damper described in Japanese Patent Application Laid-open No. 2003-175877 is structured, as shown in FIG. 13, such that two oil chambers 3A and 3B are sectioned in both sides of the vane of the rotor 2 within the casing 1, and these two oil chambers 3A and 3B are connected by two parallel oil passages 6A and 6B. A damping force generating apparatus 7 is interposed in a cross connection portion in which two oil passages 6A and 6B are crossed, and the respective oil passages 6A and 6B are provided with two check valves 8A to 8D. The different oil passages 6A and 6B are employed by changing the rotation of the rotor 2, and the damping force is generated by the single damping force generating apparatus 7.

Further, a rotary damper provided with a relief valve 30 is disclosed in Japanese Patent Application Laid-open No. 2004-231036 (FIGS. 3 and 5).

In this case, response is an important feature in the performance of a rotary damper. In the rotary damper of Japanese Patent No. 2593461, the single oil passage 4 is used in every rotation of the rotor 2, and an inertia force of the oil generated within the single oil passage 4 inhibits the response at a time when the rotation of the rotor 2 is changed.

In the rotary damper in Japanese Patent Application Laid-open No. 2003-175877, since the different oil passages 6A and 6B are used during changing the rotation of the rotor 2, the response can be improved by canceling the inertia force of the oil. However, since four check valves 8A to 8D are totally employed for setting the number of the damping force generating apparatus 7 to one, a cost increase is caused.

In the rotary damper in Japanese Patent Application Laid-open No. 2004-231036, since the relief valve 30 is provided within the housing 13, there is a problem that the size of the rotary damper is enlarged.

SUMMARY OF THE INVENTION

A first object of the present invention is to achieve a low cost while setting the number of the damping force generating apparatus to one as well as improving response during changing a stroke of a rotary damper.

A second object of the present invention is to prevent a rotary damper from being broken in the case that an abnormally high pressure is generated in an oil chamber in one side of a rotary damper, and to make the rotary damper compact.

The present invention relates to a rotary damper comprising, a casing; a rotor constituted by a shaft portion pivoted to a boss portion of the casing and a vane formed in an outer periphery of the shaft portion. A first oil chamber and a second oil chamber are sectioned in both sides of the vane of the rotor within the casing. An outer lid is attached to an outer side surface of the casing. A first oil passage and a second oil passage respectively communicating the first oil chamber and the second oil chamber are provided in parallel between an outer side surface of the casing and an inner side surface of the outer lid. Each of the first oil passage and the second oil passages has an outer lid side oil passage portion formed between a groove formed in the inner side surface of the outer lid and the outer side surface of the casing, a casing side oil passage portion formed between a groove formed in the outer side surface of the casing and the inner side surface of the outer lid, and a connection portion communicating the outer lid side oil passage portion with the casing side oil passage portion. The first oil passage is provided with a first check valve allowing flow only from the first oil chamber to the second oil chamber. The second oil passage is provided with a second check valve allowing flow only from the second oil chamber to the first oil chamber. An orifice plate is movably provided so as to face both the connection portion of the first oil passage and the connection portion of the second oil passage. The orifice plate has a first orifice hole group constituted by a plurality of orifice holes in correspondence to the oil passage so as to connect the outer lid side oil passage portion of the first oil passage with the casing side oil passage portion, and a second orifice hole group constituted by a plurality of orifice holes in correspondence to the oil passage so as to connect the outer lid side oil passage portion of the second oil passage with the casing side oil passage portion, at each of plurality of movement stop positions.

The present invention relates to a rotary damper comprising a casing, a rotor constituted by a shaft portion pivoted to a boss portion of said casing and a vane formed in an outer periphery of the shaft portion, and a first oil chamber and a second oil chamber sectioned in both sides of the vane of said rotor within said casing. The shaft portion of said rotor is provided with two oil passages respectively communicating with said first oil chamber and the second oil chamber, and a blow valve is interposed in said oil passage.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 8A and 8B show a check valve, in which FIG. 8A is a cross sectional view along a line A—A in FIG. 5, and FIG. 8B is a cross sectional view along a line B—B in FIG. 5;

FIGS. 11A and 11B show the rotary damper, in which FIG. 11A is a schematic view showing a first motion, and FIG. 11B is a schematic view showing a second motion;

DESCRIPTION OF THE PREFERRED EMBODIMENTS

A rotary damper 100 in FIGS. 1 to 10 is used in a steering damper provided in a steering wheel of a motor cycle or the like, or a suspension damper or the like provided in a rear wheel suspension apparatus of a motor cycle or the like.

Figure 1:
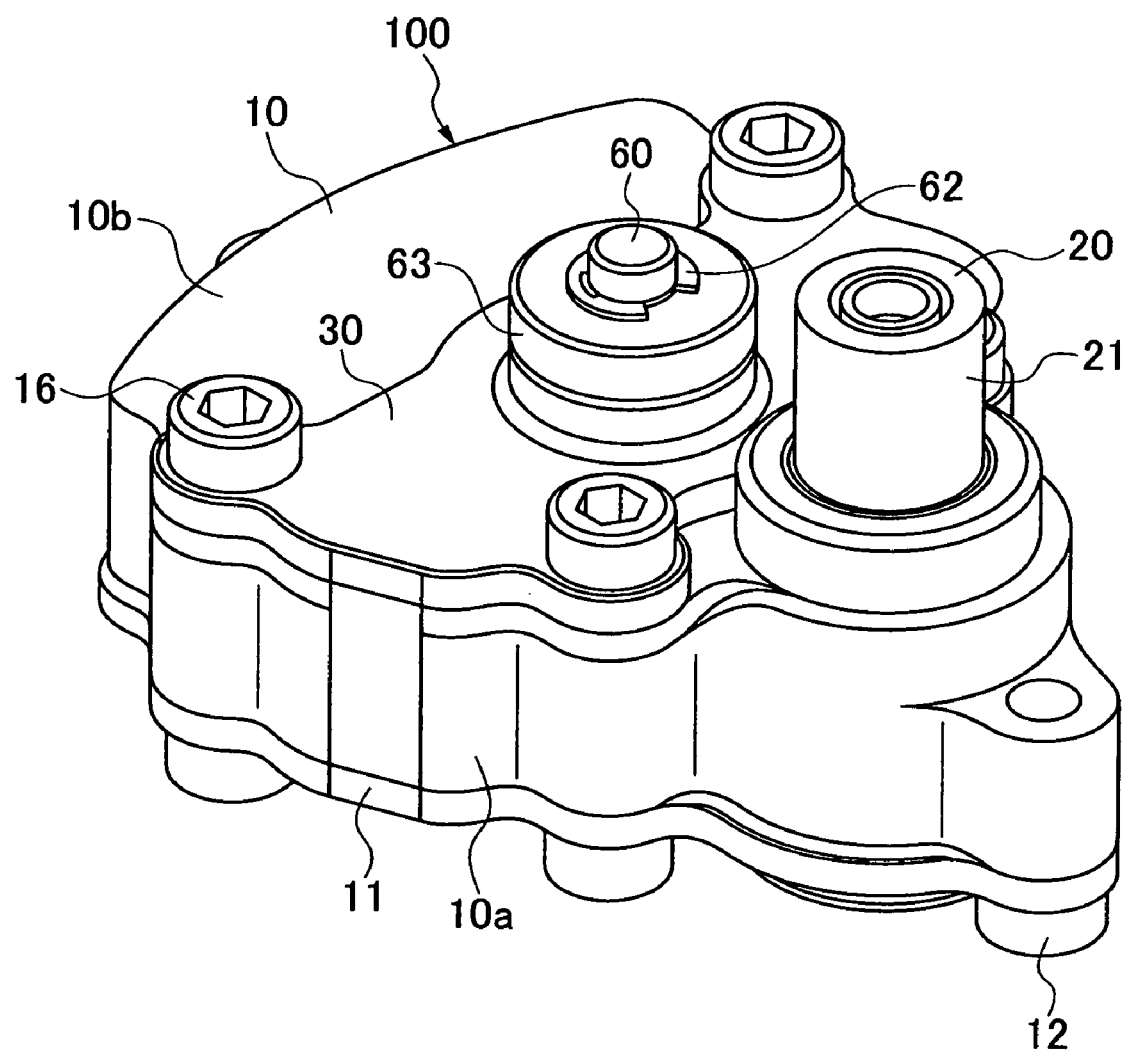
FIG. 1 is a perspective view showing a rotary damper.
Figure 2:
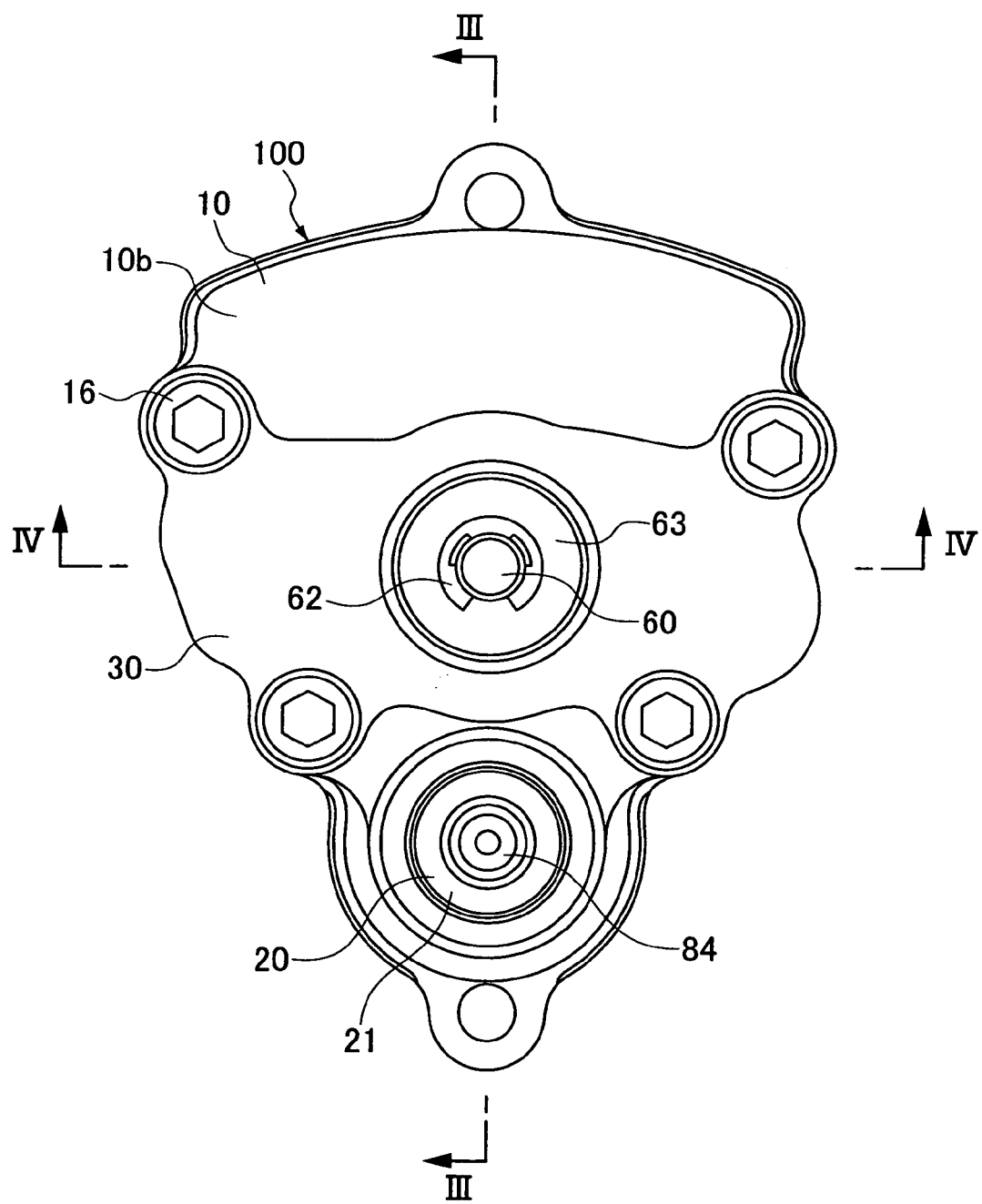
FIG. 2 is a plan view showing the rotary damper.
Figure 3:
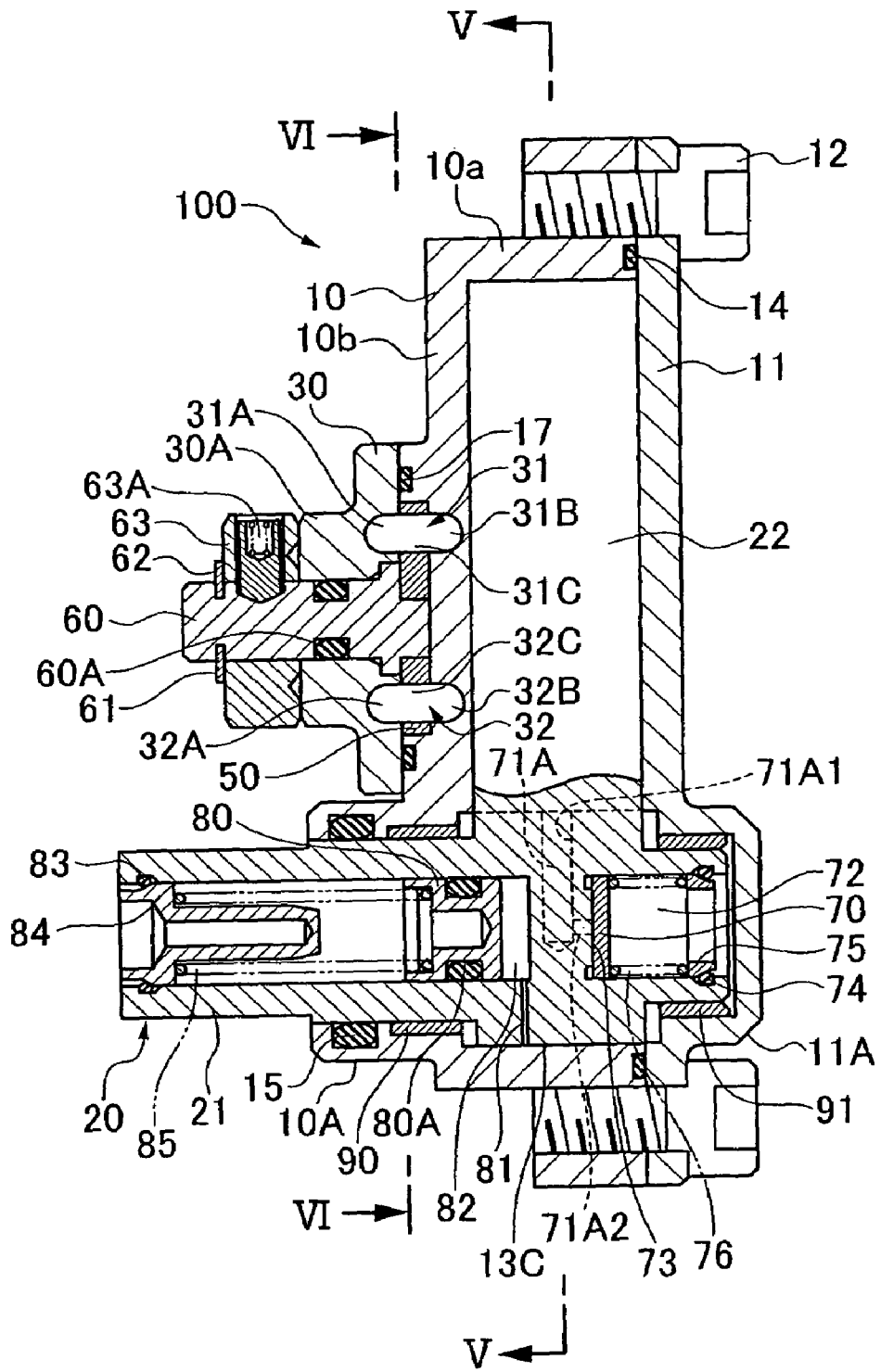
FIG. 3 is a cross sectional view along a line III—III in FIG. 2.

The rotary damper 100 is provided with a fan-like casing 10 and a bottom plate 11 thereof so as to be fastened by a bolt 12, as shown in FIGS. 1 to 4. The casing 10 is constituted by a peripheral wall portion 10a, a top side top wall portion 10b, and the bottom plate 11. The rotary damper 100 is received in the casing 10, and has a rotor 20 constituted by a shaft portion 21 which is rotatably pivoted to a boss portion 10A of the casing 10 and a boss portion 11A of the bottom plate 11 via bushes 90 and 91 respectively, and a single rocking vane 22 which is formed so as to protrude in a radial direction from an outer periphery of the shaft portion 21. As shown in FIG. 5, the boss portion 10A of the casing 10 is formed in a center portion of the fan-like casing 10. As shown in FIGS. 3 and 5, an approximately semicircular micro gap 13C (approximately 0.2 mm) is provided between an inner periphery of the boss portion of the casing 10 positioned between the bushes 90 and 91, and an outer periphery of the shaft portion 21 of the rotor 20 opposing to the inner periphery of the boss portion 10. The rotary damper 100 couples a steering shaft of the steering wheel to the shaft portion 21 of the rotor 20, or couples a rotary shaft of a suspension arm of the rear wheel suspension apparatus. The rotary damper 100 sections a first oil chamber 13A and a second oil chamber 13B filled with the oil in both sides of the vane 22 of the rotor 20, within the casing 10. The casing 10 is provided with a packing 14 in a mating face with the bottom plate 11, and is provided with an O-ring 15 in a loading portion of the shaft portion 21.

The rotary damper 100 is structured such that an outer lid 30 is attached to an outer side surface of the top wall portion 10b in an opposite side to the bottom plate 11, in the casing 10, by a bolt 16. The casing 10 is provided with a packing 17 in a mating face with the outer lid 30.

Figure 6:
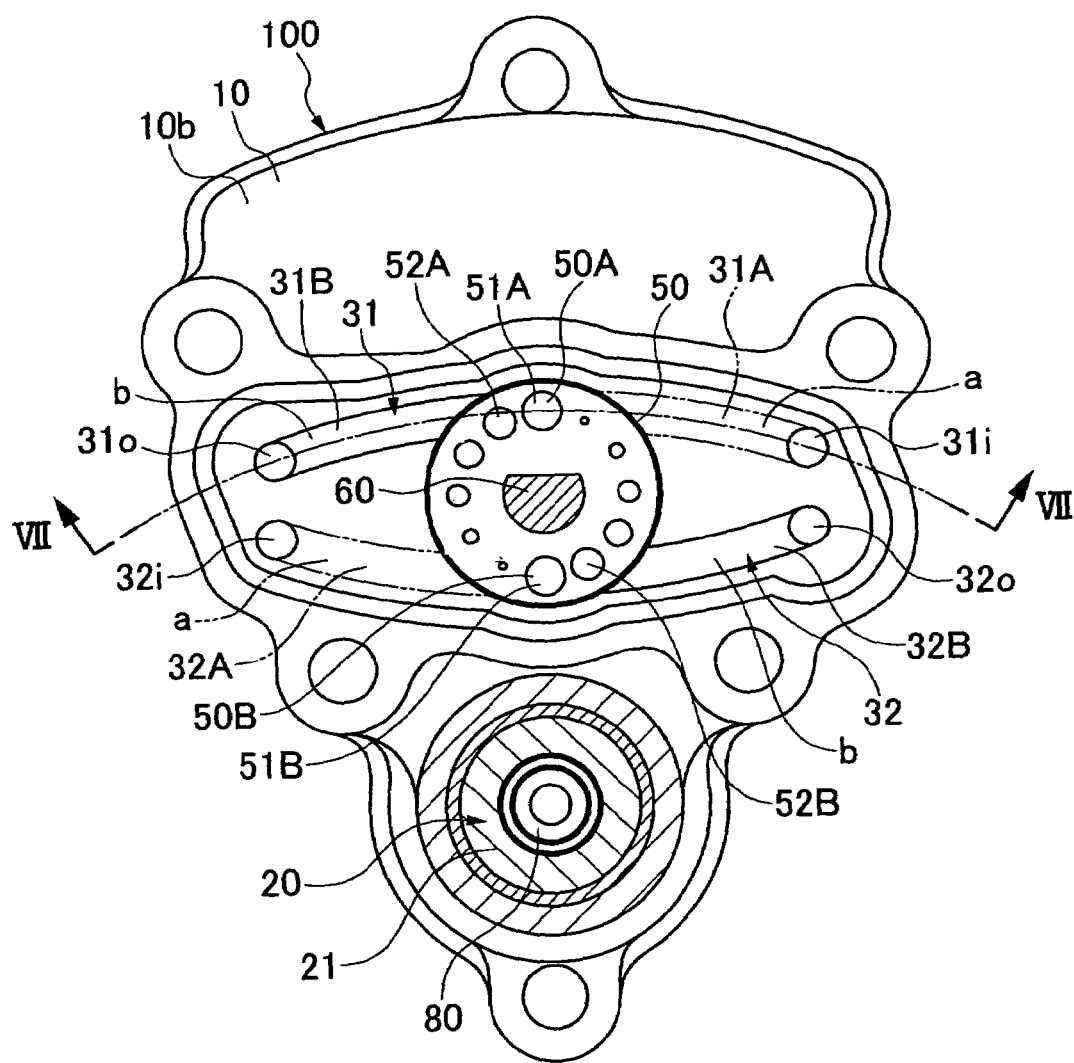
FIG. 6 is a cross sectional view along a line VI—VI in FIG. 3.
Figure 7:
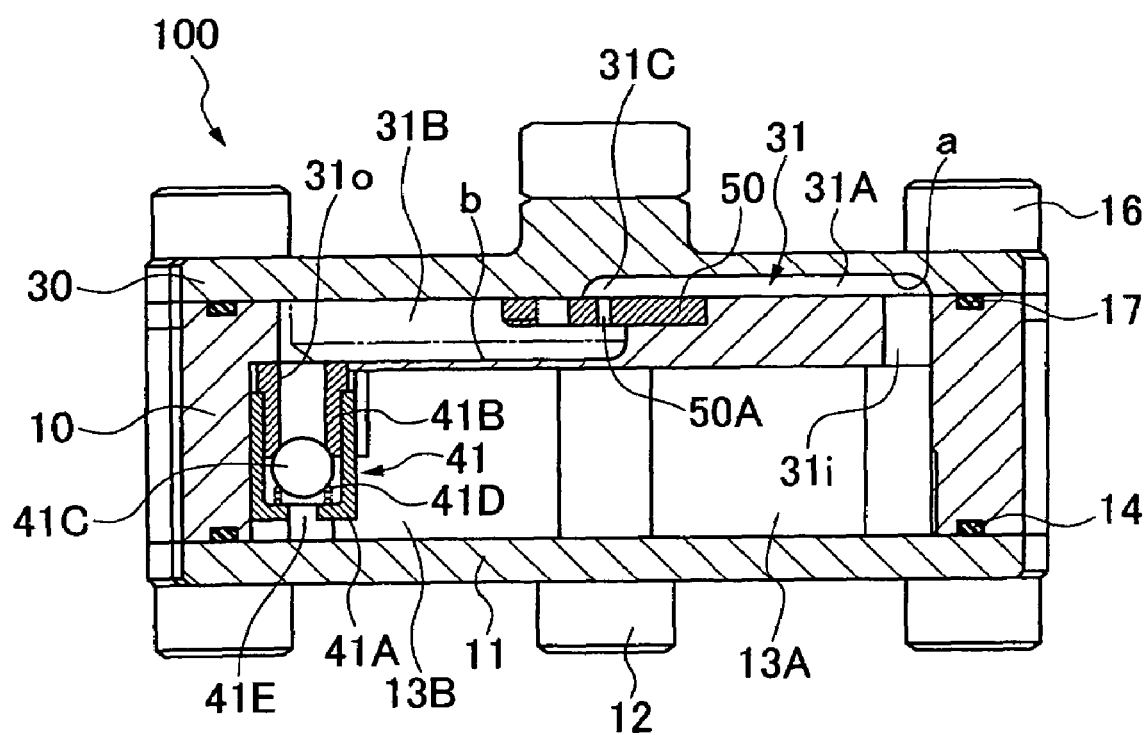
FIG. 7 is a cross sectional view along a line VII—VII in FIG. 6.

The rotary damper 100 is provided with a first oil passage 31 and a second oil passage 32 respectively communicating the first oil chamber 13A and the second oil chamber 13B in parallel, between the outer side surface of the casing 10 and the inner side surface of the outer lid 30, as shown in FIGS. 3, 6 and 7. The first oil passage 31 and the second oil passage 32 are arranged so as to form an axial symmetrical shape with respect to a rotational operating shaft 60 of an orifice plate 50 mentioned below.

The first oil passage 31 has an outer lid side oil passage portion 31A formed between a groove "a" formed in the inner side surface of the outer lid 30 and the outer side surface of the casing 10, a casing side oil passage portion 31B formed between a groove "b" formed in the outer side surface of the casing 10 and the inner side surface of the outer lid 30, and a connection portion 31C communicating the outer lid side oil passage portion 31A with the casing side oil passage portion 31B. The first oil passage 31 is provided with a first check valve 41 allowing only an oil flow from the first oil chamber 13A to the second oil chamber 13B, which makes an inlet 31i of the outer lid side oil passage portion 31A open to the first oil chamber 13A, and makes an outlet 31o of the casing side oil passage portion 31B open to the second oil chamber 13B via the first check valve 41. The inlet 31i and the outlet 31o of the first oil passage 31 are arranged in an outer side of a rocking region of the vane 22 within the casing 10 so as to be prevented from being closed by the operation of the vane 22, and are always open to the oil chambers 13A and 13B.

The second oil passage 32 has an outer lid side oil passage portion 32A formed between the groove "a" formed in the inner side surface of the outer lid 30 and the outer side surface of the casing 10, a casing side oil passage portion 32B formed between the groove "b" formed in the outer side surface of the casing 10 and the inner side surface of the outer lid 30, and a connection portion 32C communicating the outer lid side oil passage portion 32A with the casing side oil passage portion 32B. The second oil passage 32 is provided with a second check valve 42 allowing only an oil flow from the second oil chamber 13B to the first oil chamber 13A, which makes an inlet 32i of the second check valve 32A open to the second oil chamber 13B, and which makes an outlet 32o of the casing side oil passage portion 32B open to the first oil chamber 13A via the second check valve 42. The inlet 32i and the outlet 32o of the second oil passage 32 are arranged in an outer side of the rocking region of the vane 22 within the casing 10 so as to be prevented from being closed by the operation of the vane 22, and are always open to the oil chambers 13B and 13A.

Figure 8A:
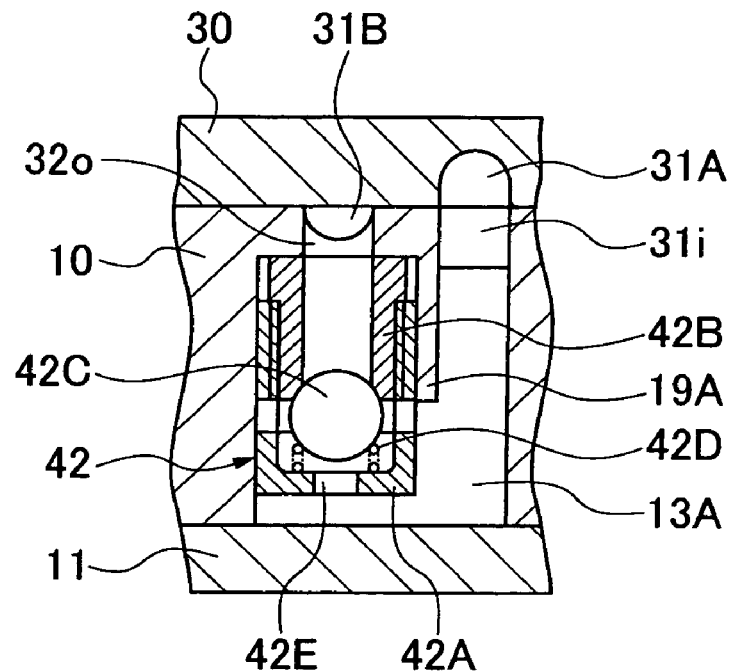
Figure 8B:
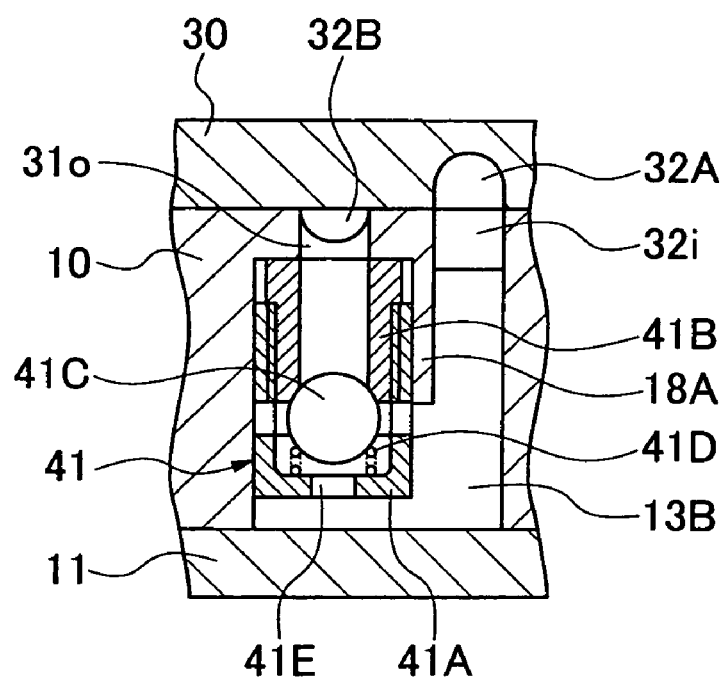
Figure 9:
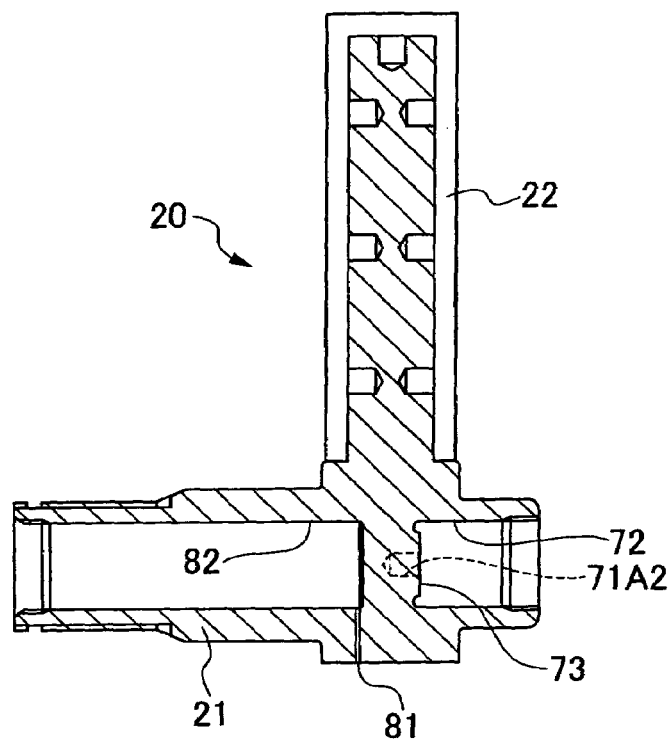
FIG. 9 is a cross sectional view showing a rotor.
Figure 10:
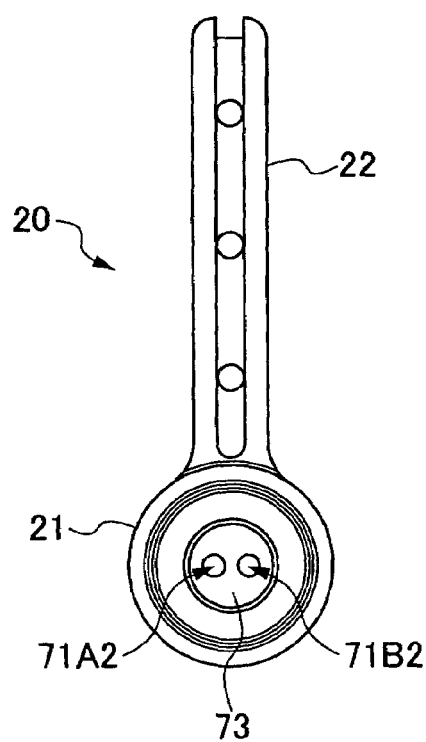
FIG. 10 is a plan view showing the rotor.

Recess portions 18 and 19 are formed in each of peripheral wall portions 10a sectioning the first oil chamber 13A and the second oil chamber 13B in both sides holding the vane 22 of the casing 10 therebetween. As shown in FIGS. 4, 5, 6, 7, 8A and 8B, the outlet 31o of the first oil passage 31 and the outlet 32o of the second oil passage 32 are respectively open to the recess portions 18 and 19, and the first check valve 41 and the second check valve 42 are respectively received in the recess portions 18 and 19. The recess portion 18 faces the second oil chamber 13B via a step wall 18A which is lower than the peripheral wall portion of the casing 10, accommodates a housing 41A of the first check valve 41, in one embodiment via a screwed connection, is provided with a valve seat 41B press inserted to the housing 41A, has a check ball 41C and a spring 41D built-in, and is provided with an opening 41E (FIG. 8B). The recess portion 19 faces the first oil chamber 13A via a step wall 19A which is lower than the peripheral wall portion of the casing 10, accommodates a housing 42A of the second check valve 42, in one embodiment via a screwed connection, is provided with a valve seat 42B press inserted to the housing 42A, has a check ball 42C and a spring 42D built-in, and is provided with an opening 42E (FIG. 8A).

The rotary damper 100 is provided with an orifice plate 50 facing both the connection portion 31C of the first oil passage 31 and the connection portion 32C of the second oil passage 32 so as to freely move between the outer side surface of the casing 10 and the inner side surface of the outer lid 30, as shown in FIGS. 3, 4, 6 and 7. The orifice plate 50 has a first orifice hole group 50A constituted by a plurality of orifice holes 51A, 52A, . . . in correspondence with the oil passage 31 so as to connect the outer lid side oil passage portion 31A of the first oil passage 31 with the casing side oil passage portion 31B, and a second orifice hole group 50B constituted by a plurality of orifice holes 51B, 52B, . . . in correspondence to the oil passage 32 so as to connect the outer lid side oil passage portion 32A of the second oil passage 32 with the casing side oil passage portion 32B, at each of a plurality of movement stop positions, such as rotation stop positions.

Figure 4:
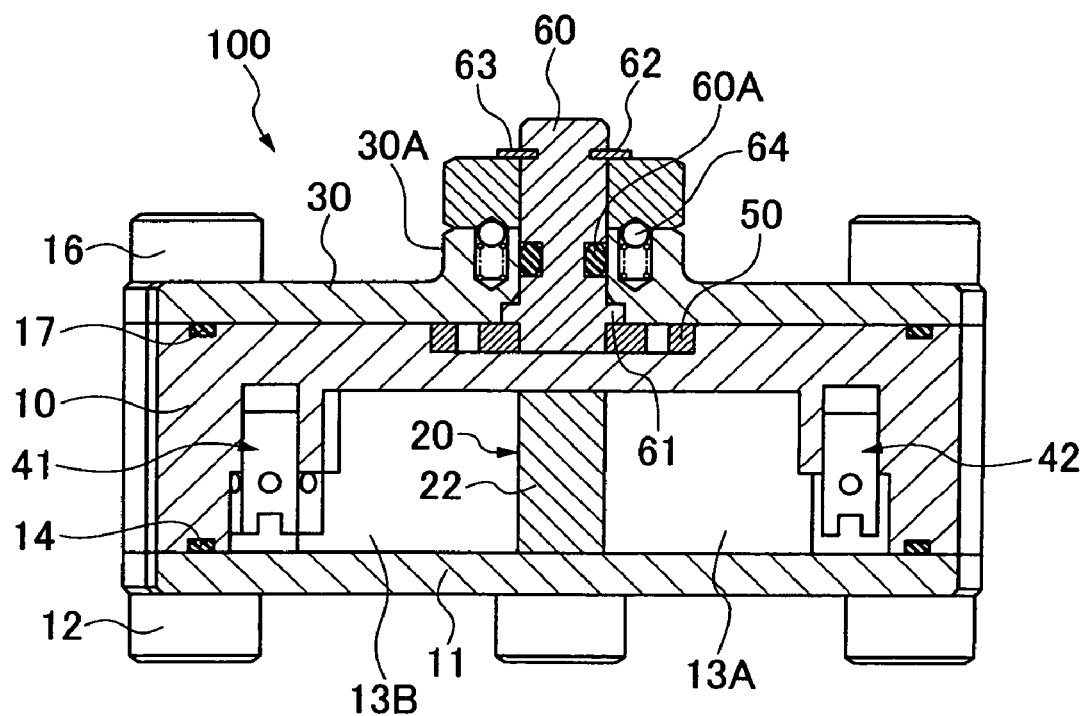
FIG. 4 is a cross sectional view along a line IV—IV in FIG. 2.
Figure 5:
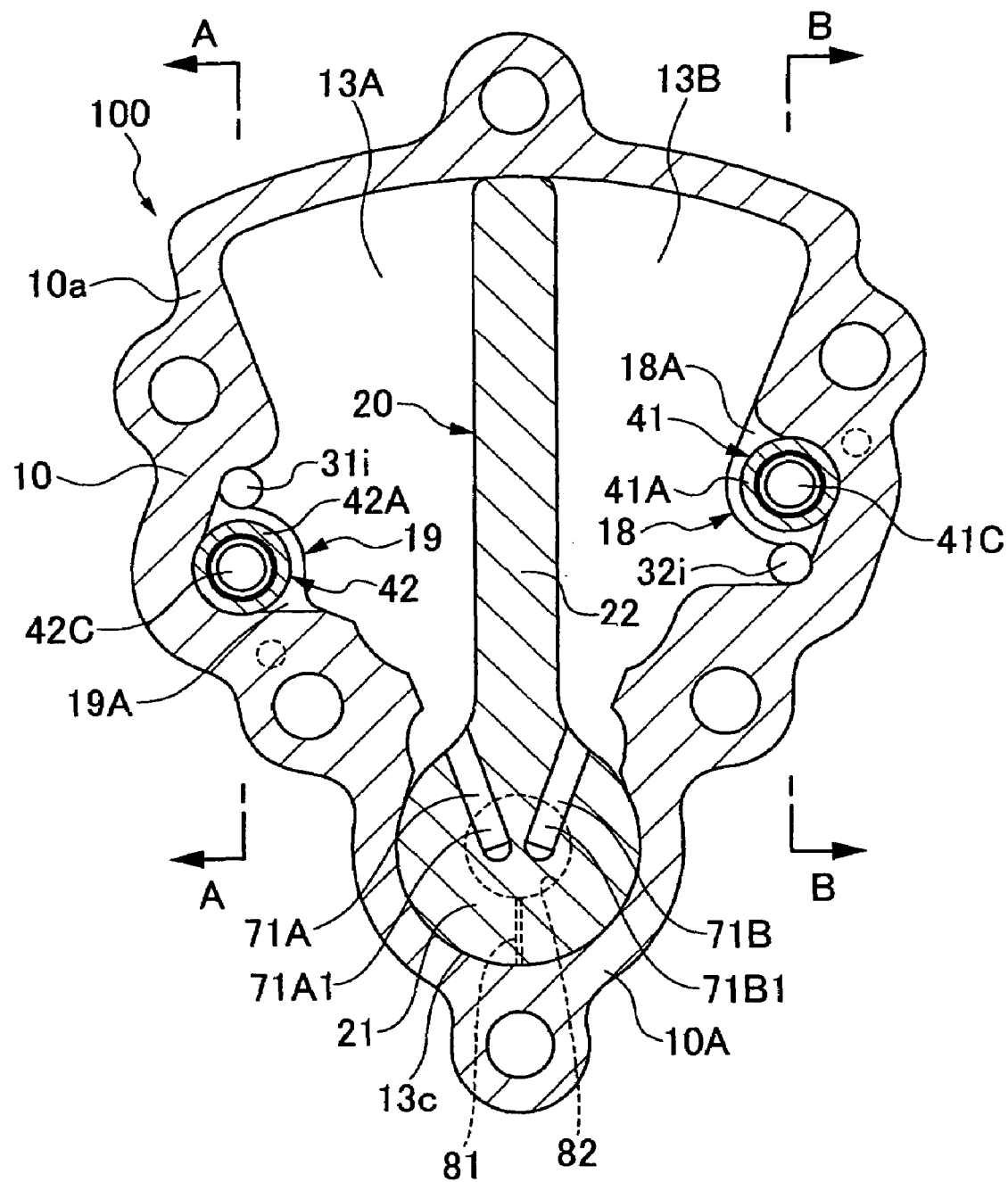
FIG. 5 is a cross sectional view along a line V—V in FIG. 3.

The orifice plate 50 is constituted by a rotating disc which is pivoted to the outer lid 30 by a rotation operating shaft thereof at a position pinched between the connection portion 31C of the first oil passage 31 and the connection portion 32C of the second oil passage 32, has a peripheral edge portion facing to each of the connection portions 31C and 32C, and is rotatably fitted to a circular recess portion in the outer side surface of the casing 10, and is provided with the first orifice hole group 50A and the second orifice hole group 50B to be arranged in the peripheral edge portion thereof so as to be axially symmetrical with each other, as shown in FIGS. 3 and 4. The rotation operating shaft 60 is inserted to the boss portion 30A of the outer lid 30 via an O-ring 60A in a liquid tight manner, brings a flange 61 into contact with the inner step surface of the outer lid 30, brings a dial 63 which is backed up to a retaining ring 62 and is fixed by a locking screw 63A into contact with the outer side surface of the outer lid 30, and can operate to rotate and stop the orifice plate 50. The dial 63 is provided with a clip stop function portion 64 with respect to an outer end surface of the boss portion 30A in the outer lid 30, as shown in FIG. 4. The dial 63 can set the orifice plate 50 to any one of the rotation stop positions, and sequentially positions each of the orifice holes 51A, 52A, . . . of the first orifice hole group 50A, and each of the orifice holes 51B, 52B, . . . of the second orifice hole group 50B, to the connection portions 31C and 32C of the first oil passage 31 and the second oil passage 32.

The orifice plate 50 accommodates the orifice holes 51A and 51B, the orifice holes 52A and 52B, . . . which are constituted by the respective orifice holes 51A, 52A, . . . of the first orifice hole group 50A and the respective orifice holes 51B, 52B, . . . of the second orifice hole group 50B, and which corresponds to the connection portion 31C of the first oil passage 31 and the connection portion 32C of the second oil passage 32 at each of the rotation stop position of the orifice plate 50 at the same timing to match the same hole diameter. The orifice diameter is made smaller step by step such to satisfy the relation the hole diameter of the orifice holes 51A and 51B> the hole diameter of the orifice holes 52A and 52B> . . .

The rotary damper 100 is provided with two oil passages 71A and 71B respectively communicating with the first oil chamber 13A and the second oil chamber 13B in the shaft portion 21 of the rotor 20, as shown in FIGS. 3, 5, 9 and 10. A blow valve 70 is interposed in the oil passages 71A and 71B. A hole 72 to which two oil passages 71A and 71B are open is provided in an end surface of one end side in an axial direction of the shaft portion 21 of the rotor 20, and the hole 72 is provided with the blow valve 70 closing an open portion of two oil passages 71A and 71B. Two oil passages 71A and 71B are constituted by two oil passages 71A1 and 71B1 in an obliquely radial direction which obliquely cross the vane 22 so as to form a line symmetry with respect to a center line along a longitudinal direction of the vane 22. Two oil passages 71A2 and 71B2 are in an axial direction which extend along an axial direction of the shaft portion 21, and two axial oil passages 71A2 and 71B2 are respectively open to a bottom surface 73 of the hole 72. The bottom surface 73 structures a seat surface of the blow valve 70.

The blow valve 70 is constituted by a disc which is energized in a close direction by a spring 76 backed up to a retaining ring 74 and a collar 75, where a fixed valve opening pressure is applied thereto.

The rotary damper 100 is provided with a approximately semicircular micro gap 13C (approximately 0.2 mm) between the inner periphery of the boss portion 10A of the casing 10 positioned between the bushes 90 and 91 mentioned above, and the outer periphery of the shaft portion 21 of the rotor 20 opposing to the inner periphery of the boss portion 10A, as shown in FIG. 3 and FIG. 5. Further, an orifice hole 81 communicating with the first oil chamber 13A and the second oil chamber 13B via the semicircular micro gap 13C is provided in the shaft portion 21 of the rotor 20. An oil chamber 82 for temperature compensation to which the orifice hole 81 is open is pierced in an end surface in the other end side in the axial direction of the shaft portion 21, and a free piston 80, such as a movable partition wall member, for temperature compensation which slides via the O-ring 80A is internally inserted to the oil chamber 82. The free piston 80 is pressurized by the spring 85 which is backed up to the retaining ring 83 and the stopper 84. The rotary damper is structured to communicate the first oil chamber 13A and the second oil chamber 13B with the oil chamber 82 of the shaft portion 21 in the rotor 20 via the semicircular micro gap 13C and the orifice hole 81. A rubber bladder may be used in place of the free piston 80.

Figure 11A:
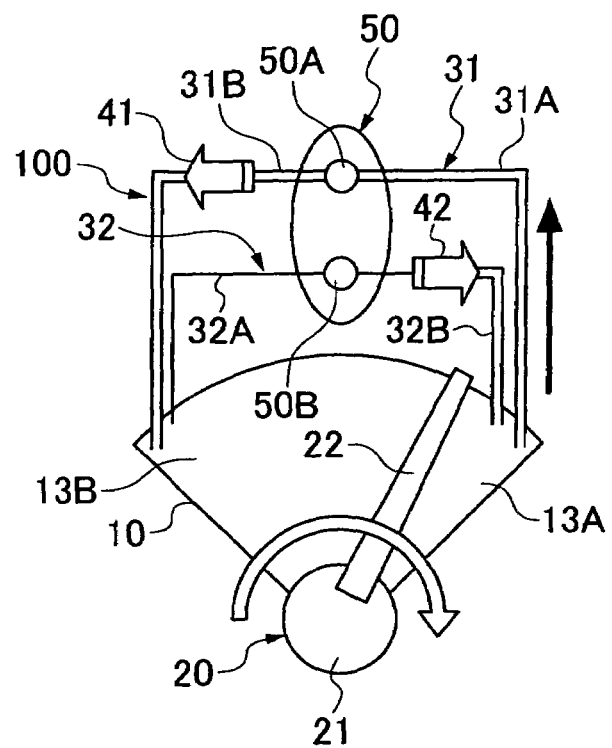
Figure 11B:
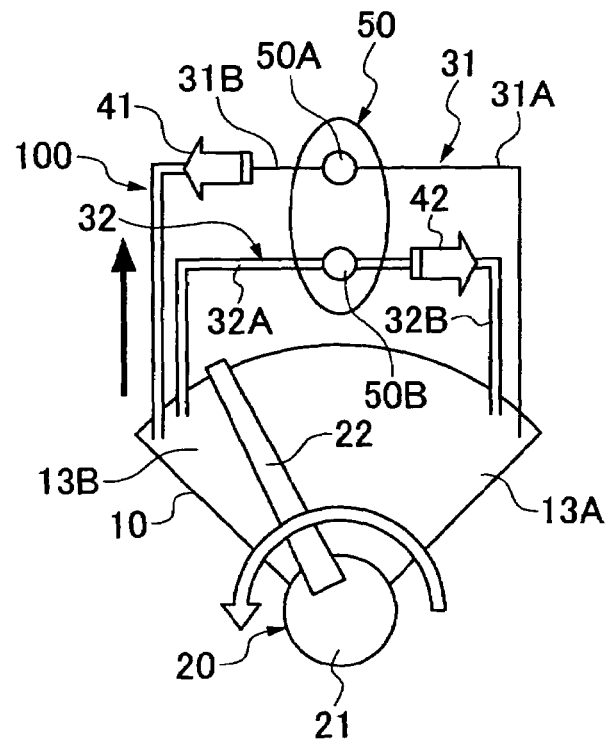
Figure 12:
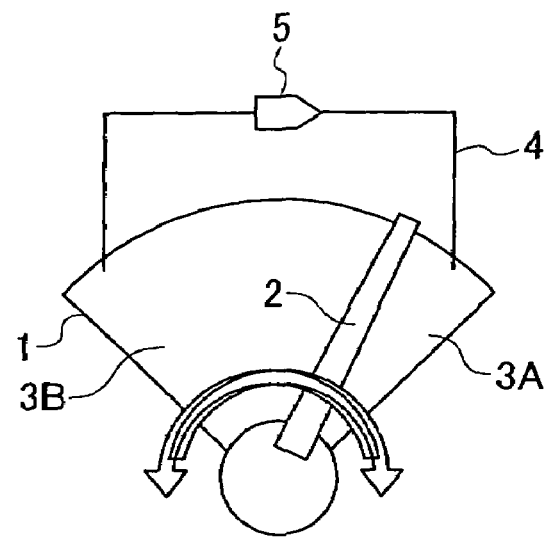
FIG. 12 is a schematic view showing a conventional art.
Figure 13:
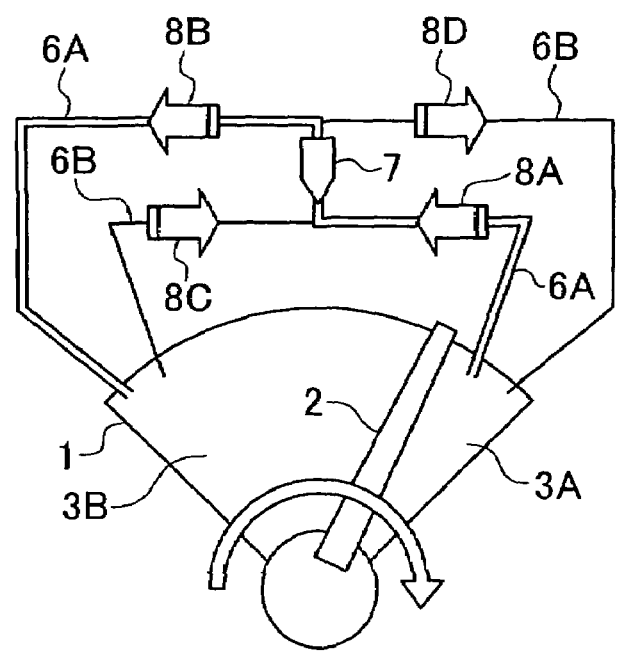
FIG. 13 is a schematic view showing the conventional art.

A description will be given below of a damping motion of the rotary damper 100 (FIGS. 11A and 11B).

(1) When the rotor 20 turns to the right as shown in FIG. 11A, the oil in the first oil chamber 13A is pressurized, and the oil is transferred from the outlet 31o and the first check valve 41 to the second oil chamber 13B through the inlet 31i of the first oil passage 31, the outer lid side oil passage portion 31A, the connection portion 31C, such as the first orifice hole group 50A of the orifice plate 50, and the casing side oil passage portion 31B.

The orifice plate 50 applies a resistance force in correspondence to a hole diameter of any one orifice hole 51A, 52A, . . . positioned to the connection portion 31C in the first orifice hole group 50A, for example, the hole diameter of the orifice hole 51A, to the oil in the middle of the transfer, and applies a fixed damping force to the rotor 20.

At this time, the oil in the first oil chamber 13A is inhibited from flowing into the second oil chamber 32, on the basis of a checking effect of the second check valve 42.

(2) When the rotor 20 turns to the left as shown in FIG. 11B after the motion mentioned in the item (1), the oil in the second oil chamber 13B is pressurized. The oil is transferred from the outlet 32o and the second check valve 42 to the first oil chamber 13A through the inlet 32i of the second oil passage 32, the outer lid side oil passage portion 32A, the connection portion 32C, such as the second orifice hole group 50B of the orifice plate 50, and the casing side oil passage portion 32B. Since the second oil passage 32 does not circulate the oil in the item (1) mentioned above and is not affected by the inertia force by extension, the oil is smoothly transferred from the second oil chamber 13B passing through the second oil passage 32 to the first oil chamber 13A.

The orifice plate 50 applies a resistance force in correspondence to a hole diameter of any one orifice holes 51B, 52B, . . . positioned to the connection portion 32C in the second orifice hole group 50B, for example, the hole diameter of the orifice hole 51B, to the oil in the middle of the transfer, and applies a fixed damping force to the rotor 20. The hole diameter of the orifice hole 51B is equal to the hole diameter of the oil diameter of the orifice hole 50A mentioned in the item (1), and the orifice plate 50 applies the same damping force to both the rightward and leftward rotations of the rotor 20.

At this time, the oil in the second oil chamber 13B is inhibited from flowing into the first oil chamber 31, on the basis of a checking effect of the first check valve 41.

The blow valve 70 is operated in the manner mentioned below.

In the case that the vane 22 compresses the oil chamber 13A and an excessive pressure is generated in the oil chamber 13A, due to an inversion of the motor cycle or the like, a working fluid within the oil chamber 13A passes through the oil passage 71A1 in the obliquely radial direction. The oil passage 71A2 in the axial direction which are formed in the shaft portion 21. The working fluid opens the blow valve 70 closing the opening of the oil passage 71A2 open to the bottom surface 73 of the hole 72 against the energizing force of the spring 76 so as to reach the oil chamber within the hole 72, and further circulates to the oil chamber 13B in the opposite side to the vane 22 through the oil passage 71B2 in the axial direction open to the bottom surface 73 of the hole 72 and the oil passage 71B1 in the obliquely radial direction, as shown in FIGS. 3, 5, 9 and 10.

As a result, it is possible to prevent the excessive pressure from being generated within the oil chamber 13A so as to prevent the damper 100 from being broken.

In the case that the oil chamber 13B in the opposite side to the vane 22 is compressed and excessive pressure is generated in the oil chamber 13B, the opposite flow to the above is generated.

In accordance with the present embodiment, the following operation and effect can be achieved.

(a) Since the first oil chamber 13A and the second oil chamber 13B are communicated by two oil passages 31 and 32, it is possible to do away with the influence of the inertia force in each of the oil passages 31 and 32 when changing the stroke of the rotary damper 100, and it is possible to improve response.

Since the first oil passage 31 and the second oil passage 32 are formed by the outer side surface of the casing 10 and the inner side surface of the outer lid 30, it is possible to easily work on this element, and it is possible to stabilize the performance.

(b) The orifice plate 50 is movably provided so as to face to both the connection portion 31C between the outer lid side oil passage portion 31A of the first oil passage 31 and the casing side oil passage portion 31B, and the connection portion 32C between the outer lid side oil passage portion 32A of the second oil passage 32 and the casing side oil passage portion 32B. The orifice plate 50 is structured such as to have the first orifice hole group 50A constituted by a plurality of orifice holes 51A, 52A, . . . in correspondence to the oil passage 31 so as to conduct the outer lid side oil passage portion 31A of the first oil passage 31 with the casing side oil passage portion 31B. The second orifice hole group 50B is constituted by a plurality of orifice holes 51B, 52B, . . . in correspondence to the oil passage 32 so as to conduct the outer lid side oil passage portion 32A of the second oil passage 32 with the casing side oil passage portion 32B. Accordingly, in spite of the provision of two oil passages 31 and 32, it is sufficient that one orifice plate 50 is provided as the damping force generating apparatus, and only two check valves 41 and 42 are sufficient. Therefore, it is possible to reduce cost.

(c) Since the orifice plate 50 is constituted by the rotating disc, it is possible to improve the assembling characteristic in the casing 10 and operability.

(d) Since the diameter of the orifice holes 51A, 52A, . . . of the first orifice group 50A in the orifice plate 50 is set equal to the diameter of the orifice holes 51B, 52B, . . . of the second orifice group 50B in correspondence thereto, it is possible to generate damping force having the same magnitude at the right and left rocking strokes, and it is possible to preferably apply correct forces to the steering damper or the like.

(e) The first oil passage 31 is structured such that the outer lid side oil passage portion 31A is open to the first oil chamber 13A, and the casing side oil passage portion 31B is open to the second oil chamber 13B. The second oil passage 32 is structured such that the outer lid side oil passage portion 32A is open to the second oil chamber 13B, and the casing side oil passage portion 32B is open to the first oil chamber 13A. Accordingly, in both of the first oil passage 31 and the second oil passage 32, the working fluid always flows from the outer lid side oil passage portions 31A and 32A to the casing side oil passage portions 31B and 32B. As a result, a force pressing the orifice plate 50 to the upper surface of the casing 10 is applied. The force is preferably applied to the side of the casing 10 corresponding to the bolt fastening direction, rather than being applied to the side of the outer lid 30 where the load is applied in the bolt come-off direction. Further, since the casing 10 is generally formed by a more rigid body than the outer lid 30, the structure is preferable in a point that great stress can be received.

(f) Since the recess portions 18 and 19 in which the first check valve 41 and the second check valve 42 are respectively received are formed in the peripheral wall portion 10a of the casing 10, the recess portions 18 and 19 can be provided with the housings 41A and 42A of the check valves 41 and 42, the valve seats 41B and 42B, the balls 41C and 42C and the springs 41D and 42D, even while keeping the thickness of the peripheral wall portion small. It is thereby possible to obtain a weight saving of the rotary damper 100.

(g) The rotor 20 is provided with the blow valve. Accordingly, even where the impact force is applied to the rotor 20 via the steering wheel, for example, during inversion of the motor cycle, and an abnormal high pressure is generated in the one side oil chamber 13A or 13B, the blow valve 70 can be opened so as to relieve the working fluid to the other side oil chamber 13A or 13B in the lower pressure side, so that it is possible to prevent the rotary damper 100 from being broken.

(h) Since the blow valve 70 is provided in one side end surface of the shaft portion 21 of the rotor 20, it is possible to effectively make good use of the space in comparison with the case that the blow valve is provided in the casing 10. It is possible to make the rotary damper 100 compact. Further, the assembling characteristic of the blow valve 70 is improved.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the orifice hole of the first orifice hole group in the orifice plate and the orifice hole of the second orifice hole group may be set to have different hole diameters in the case of correspondence with the first oil passage and the second oil passage at each of the movement stop positions of the orifice plate at the same timing points. Accordingly, since the diameter of the orifice hole of the first orifice hole group in the orifice plate is differentiated from the diameter of the orifice hole of the corresponding second orifice hole group, it is possible to generate damping forces having different magnitudes in the rightward and leftward rocking strokes. For example, an expansion side damping force is made higher so as to inhibit the suspension spring from being expanded. Accordingly, the structure can be preferably employed in the suspension damper or the like.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be encompassed within a scope of equivalents thereof with respect to the features set out in the appended claims.

What is claimed is:

1. A rotary damper comprising:
   a casing;
   a rotor having a shaft portion pivoted to a boss portion of said casing and a vane formed in an outer periphery of the shaft portion;
   a first oil chamber and a second oil chamber sectioned in both sides of the vane of said rotor within said casing,
   an outer lid attached to an outer side surface of said casing, a first oil passage and a second oil passage respectively communicating said first oil chamber and the second oil chamber provided in parallel between an outer side surface of said casing and an inner side surface of said outer lid,
   each of said first oil passage and the second oil passage has an outer lid side oil passage portion formed between a groove formed in the inner side surface of said outer lid and the outer side surface of said casing, a casing side oil passage portion formed between a groove formed in the outer side surface of said casing and the inner side surface of said outer lid, and a connection portion communicating said outer lid side oil passage portion with the casing side oil passage portion,
   said first oil passage being provided with a first check valve allowing a flow only from the first oil chamber to the second oil chamber, said second oil passage being provided with a second check valve allowing a flow only from the second oil chamber to the first oil chamber,
   an orifice plate being movably provided so as to face both the connection portion of said first oil passage and the connection portion of the second oil passage,
   wherein said orifice plate has a first orifice hole group having a plurality of orifice holes in correspondence to said oil passage so as to connectt the outer lid side oil passage portion of the first oil passage with the casing side oil passage portion, and a second orifice hole group constituted by a plurality of orifice holes in correspondence to said oil passage so as to connect the outer lid side oil passage portion of the second oil passage with the casing side oil passage portion, at each of a plurality of movement stop positions.

2. A rotary damper according to claim 1, wherein said orifice plate is pivoted at a position pinched by the respective connection portions of said first oil passage and the second oil passage, and comprises a rotating disc having a peripheral edge portion facing to each of the connection portions, said first orifice hole group being the second orifice hole group are arranged in said peripheral edge portion in an axially symmetrical manner.

3. A rotary damper according to claim 1, wherein the orifice hole of the first orifice hole group in said orifice plate and the orifice hole of the second orifice hole group are set to have the same hole diameter in the case of correspondence with to the first oil passage and the second oil passage at each of the movement stop positions of the orifice plate at the same timing point.

4. A rotary damper according to claim 2, wherein the orifice hole of the first orifice hole group in said orifice plate and the orifice hole of the second orifice hole group are set to have the same hole diameter in the case of correspondence with the first oil passage and the second oil passage at each of the movement stop positions of the orifice plate at the same timing point.

5. A rotary damper according to claim 1, wherein the orifice hole of the first orifice hole group in said orifice plate and the orifice hole of the second orifice hole group may be set to have different hole diameters in the case of correspondence with the first oil passage and the second oil passage at each of the movement stop positions of the orifice plate at the same timing point.

6. A rotary damper according to claim 2, wherein the orifice hole of the first orifice, hole group in said orifice plate and the orifice hole of the second orifice hole group may be set to have different hole diameters in the case of correspondence with the first oil passage and the second oil passage at each of the movement stop positions of the orifice plate at the same timing point.

7. A rotary damper according to claim 1, wherein said first oil passage is structured such that said outer lid side oil passage portion is open to said first oil chamber, said casing side oil passage portion is open to said second oil chamber, said second oil passage being structured such that said outer lid side oil passage portion is open to said second oil chamber, and said casing side oil passage portion is open to said first oil chamber.

8. A rotary damper according to claim 2, wherein said first oil passage is structured such that said outer lid side oil passage portion is open to said first oil chamber, said casing side oil passage portion is open to said second oil chamber, said second oil passage is structured such that said outer lid side oil passage portion is open to said second oil chamber, and said casing side oil passage portion is open to said first oil chamber.

9. A rotary damper according to claim 3, wherein said first oil passage is structured such that said outer lid side oil passage portion is open to said first oil chamber, said casing side oil passage portion is open to said second oil chamber, said second oil passage is structured such that said outer lid side oil passage portion is open to said second oil chamber, and said casing side oil passage portion is open to said first oil chamber.

10. A rotary damper claim 4, wherein said first oil passage is structured such that said outer lid side oil passage portion is open to said first oil chamber, said casing side oil passage portion is open to said second oil chamber, said second oil passage is structured such that said outer lid side oil passage portion is open to said second oil chamber, and said casing side oil passage portion is open to said first oil chamber.

11. A rotary damper according to claim 1, wherein said first oil passage and the second oil passage are respectively open to peripheral wall portions sectioning said first oil chamber and the second oil chamber in both sides pinching said vane of said casing there between, and further comprising recess portions in which said first check valve and the second check valve are respectively received.

12. A rotary damper according to claim 2, wherein said first oil passage and the second oil passage are respectively open to peripheral wall portions sectioning said first oil chamber and the second oil chamber in both sides pinching said vane of said casing there between, and further comprising recess portions in which said first check valve and the second check valve are respectively received.

13. A rotary damper according to claim 3, wherein said first oil passage and the second oil passage are respectively open to peripheral wall portions sectioning said first oil chamber and the second oil chamber in both sides pinching said vane of said casing there between, and further comprising recess portions in which said first check valve and the second check valve are respectively received.

14. A rotary damper according to claim 4, wherein said first oil passage and the second oil passage are respectively open to peripheral wall portions sectioning said first oil chamber and the second oil chamber in both sides pinching said vane of said casing there between, and further comprising recess portions in which said first check valve and the second check valve are respectively received are formed.

15. A rotary damper according to claim 1, wherein a hole diameter of a plurality of orifice holes in said first orifice group and a hole diameter of a plurality of orifice holes in said second orifice group are progressively smaller.

* * * * *